(12) United States Patent
Wasiewicz

(10) Patent No.: US 6,801,156 B1
(45) Date of Patent: Oct. 5, 2004

(54) FREQUENCY-AGILE MONOPULSE TECHNIQUE FOR RESOLVING CLOSELY SPACED TARGETS

(75) Inventor: Richard Wasiewicz, Tully, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 10/627,481

(22) Filed: Jul. 25, 2003

(51) Int. Cl.[7] .............................................. G01S 13/44

(52) U.S. Cl. ..................... 342/95; 342/140; 342/141; 342/149; 342/152; 342/191

(58) Field of Search .............................. 342/80, 89, 90, 342/95–97, 139–141, 147, 149, 152, 156–158, 191

(56) References Cited

U.S. PATENT DOCUMENTS

| | | | | |
|---|---|---|---|---|
| 3,078,453 A | * | 2/1963 | McGillem et al. | 342/153 |
| 3,130,402 A | * | 4/1964 | Kuck | 342/80 |
| 3,242,487 A | * | 3/1966 | Hammack | 342/103 |
| 4,387,373 A | * | 6/1983 | Longuemare, Jr. | 342/25 |
| 4,646,095 A | * | 2/1987 | Kanter | 342/149 |
| 5,334,980 A | * | 8/1994 | Decker | 342/25 |
| 5,579,011 A | * | 11/1996 | Smrek | 342/113 |
| 5,831,570 A | * | 11/1998 | Ammar et al. | 342/26 |
| 5,945,926 A | * | 8/1999 | Ammar et al. | 340/970 |
| 6,087,974 A | * | 7/2000 | Yu | 342/62 |
| 6,229,475 B1 | * | 5/2001 | Woolley | 342/93 |
| 6,404,379 B1 | * | 6/2002 | Yu et al. | 342/80 |
| 6,633,253 B2 | * | 10/2003 | Cataldo | 342/25 |

OTHER PUBLICATIONS

"Multiple radar targets estimation by exploiting induced amplitude modulation", Gini, F.; Greco, M.; Farina, A.; Aerospace and Electronic Systems, IEEE Trans on, vol. 39, Issue: Oct. 4, 2003 Ps:1316–1332.*

"Closed–form four–channel monopulse two–target resolution", Yibin Zheng; Shu–Ming Tseng; Kai–Bor Yu; Aerospace and Electronic Systems, IEEE Transactions on, vol: 39, Issue Jul. 3, 2003 pp.:1083–1089.*

"Tracking separating targets with a monopulse radar: idealized resolution", Ogle, T.L.; Blair, W.D.; Brown, G.C.; Information Fusion, 2003. Proceedings of the Sixth International Conference of, vol.: 2, Jul. 8–11, 2003 pp.:1149–1155.*

"Monopulse radar detection and localization of multiple targets via joint multiple–bin processing", Xin Zhang; Willett, P.; Bar–Shalom, Y.; Radar Proceedings. 2003 IEEE Conf on, May 5–8, 2003 Ps:232–237.*

* cited by examiner

*Primary Examiner*—John B. Sotomayor
(74) *Attorney, Agent, or Firm*—Plevy & Howard, PC

(57) ABSTRACT

A monopulse radar system generates elevation and azimuth difference monopulse estimates of the location of targets in each range cell, where the target may be either a single or plural target, each of which is made up of multiple scattering sources. Each azimuth-elevation estimate is based on a transmitted pulse or burst at a given frequency, different from other frequencies in a set of pulses or bursts. A test statistic is generated for each set. The statistic relates to the shape in an azimuth-elevation plane of the cluster of estimates. The test statistic is compared with a threshold to decide whether a single target or plural targets exist in the range cell.

23 Claims, 1 Drawing Sheet

FREQUENCY-AGILE MONOPULSE TECHNIQUE FOR RESOLVING CLOSELY SPACED TARGETS

FIELD OF THE INVENTION

This invention relates to active target detection and location systems such as radar, and more particularly to the resolution of plural, closely spaced targets.

BACKGROUND OF THE INVENTION radar has long been used for area surveillance and tracking of targets. Early radar systems had trouble resolving plural targets which were at approximately the same bearing and at similar ranges, in part because the angular resolution of the radar system was limited by the beamwidth of the radar antenna. As a general rule, a radar antenna can distinguish two targets from one if their angular separation exceeds approximately 0.8 times the 3 dB receive beamwidth. This suggests that improvement in resolving closely spaced targets can be achieved by the simple expedient of decreasing the 3 dB beamwidth of the radar receive antenna. However, the beamwidth of an antenna cannot be decreased without limit, as reduced beamwidth requires a larger antenna dimension, and many radar uses place limits on those dimensions. Additionally, reduced 3 dB beamwidth requires that a scanning antenna move more slowly than an antenna with a greater beamwidth, if surveillance coverage is to be reliable. Monopulse techniques were introduced to aid in resolving closely spaced targets with antennas of reasonable dimensions.

Monopulse radar systems use antenna arrangements which generate slightly diverging plural beams in a given direction. For transmission of a radar pulse or burst, the sum of the plural beams is used. Monopulse reception involves processing which takes the difference between the signals received on mutually adjacent beams, thereby forming or defining phase and amplitude responses within the sum beam which can be exploited to determine the angle of the target relative to the boresight of the antenna. However, monopulse techniques do not, in general, improve the resolution between closely spaced targets.

Improved resolution between closely spaced targets is desired in a monopulse context.

SUMMARY OF THE INVENTION

A monopulse radar method according to an aspect of the invention is for detecting closely spaced targets. The method includes the steps of transmitting a first burst of electromagnetic pulses at a first frequency toward a region which may contain a target, and, using monopulse techniques, estimating azimuth and elevation angles of the target from return signals arising from the first burst and in a particular range cell or bin. The method includes the further steps of transmitting toward the region a second burst of electromagnetic pulses at a second frequency, different from the first frequency, and, using monopulse techniques, estimating azimuth and elevation angles from return signals in the particular range cell and arising from the second burst. A third burst of electromagnetic pulses is transmitted toward the region at a third frequency, different from the first and second frequencies, and using monopulse techniques, the azimuth and elevation angles are estimated from return signals arising from the third burst and in the particular range cell. An arithmetic value associated with the mean value of the first, second, and third azimuth and elevation estimates is computed to form a test statistic, the magnitude of which is indicative of the number of targets present in the range cell. The test statistic is compared with a decision threshold, and but a single target is deemed to be present in the range cell if the test statistic is less than the decision threshold, and two or plural targets are deemed to be present in the range cell if the test statistic is greater than the decision threshold.

A monopulse radar system according to an aspect of the invention comprises a transmitter arrangement for recurrently transmitting one of radar pulses and bursts, the frequencies of which are controllable. In this context, a burst includes a plurality of pulses. A monopulse receiving system includes a mechanism for generating an elevation difference beam and an azimuth difference beam responsive to target echoes originating from the one of radar pulses and bursts. A monopulse processor generates monopulse estimates of the azimuth and elevation angle of the centroid of clustered scatterers making up target(s). The system also includes means coupled to the transmitting means and to the monopulse processing means for causing the transmitter arrangement to transmit plural ones of the one of radar pulses and bursts, and for generating a test statistic representative of the shape of the cluster of the monopulse estimates arising from the plural ones. A comparator compares the test statistic with a decision value to declare the presence of a single target when the test statistic is one of greater than or less than the decision value and to declare the presence of plural targets when the test statistic is the other one of greater than or less than the decision value.

DESCRIPTION OF THE INVENTION

Figure 1:
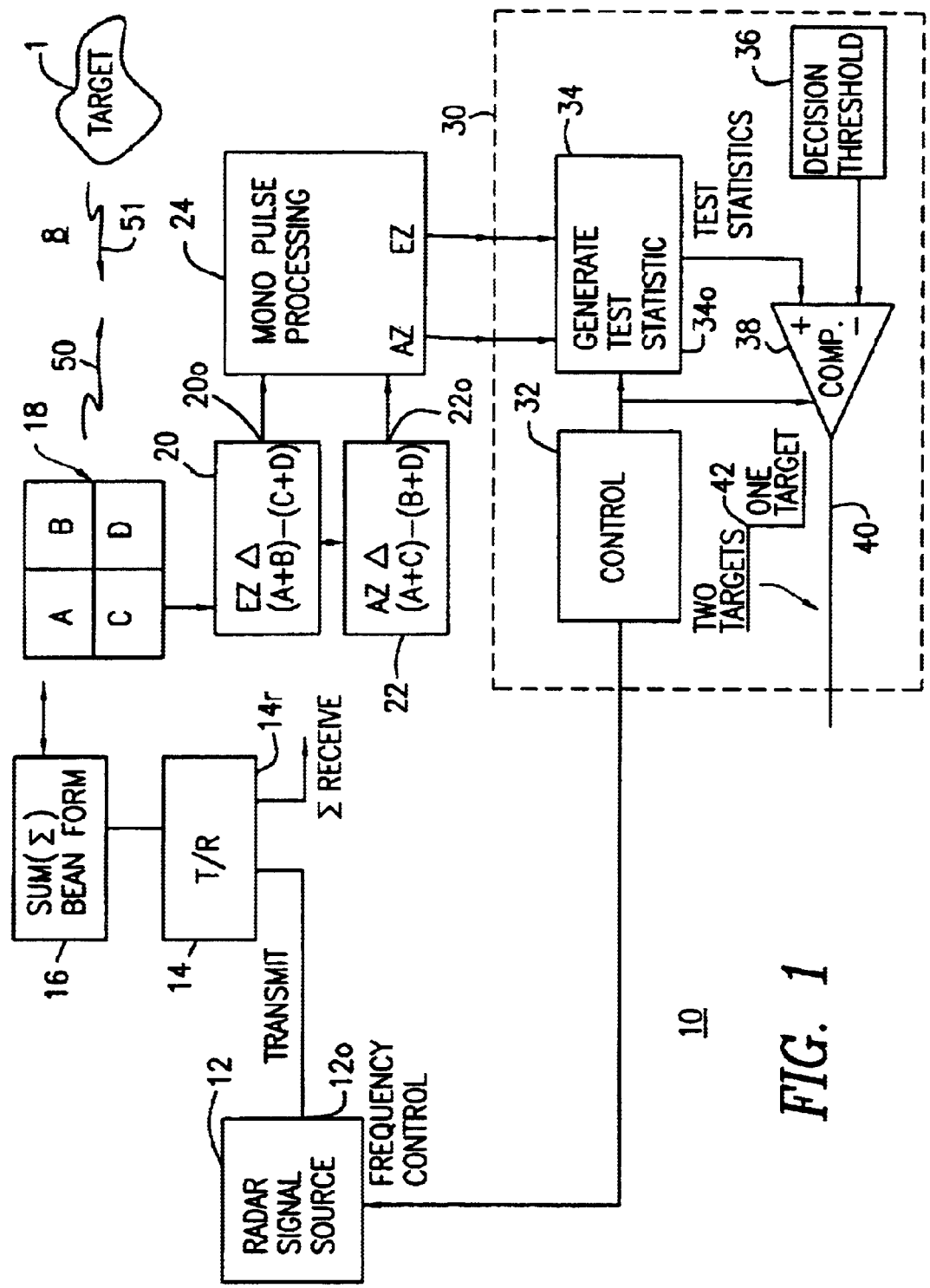
FIG. 1 is a simplified diagram of a monopulse radar system according to an aspect of the invention.

A typical aircraft target contains multiple scattering centers, each of which reflects back toward the radar an amplitude-scaled and phase-shifted copy or echo of the electromagnetic radar signal originating from the radar and incident upon the aircraft. These reflected or echo signals return to a receive antenna of the radar system. Upon reception, the multiple reflected signals interfere with each other (add vectorially) such that a monopulse azimuth/elevation estimate of the target's centroid may be in error. If the frequency of the radar signal is changed, and another monopulse measurement is taken, the resulting error pair is likely to differ from the first because the phase relationships of the various scatterers also changes. An "error pair" is the deviation in azimuth and elevation of the monopulse estimate of the target's location from the actual location. These two estimates or measurements, and any subsequent estimates taken at different frequencies will tightly cluster about the target centroid.

If two targets are present in the receive antenna beam at the same range, or in the same range cell, and the process of making monopulse estimates is repeated, the monopulse estimates, which is to say the azimuth-elevation angle pairs, will form or define an elongated cluster, the major axis of which is approximately collinear with a line extending between the targets in the azimuth-elevation plane. The difference in cluster shape between the situation in which but a single target is present and the situation in which two (or more) targets are present can be exploited to determine if a single or plural targets is/are present in the range cell. In general, the location of a single target can be identified, and the locations of two targets can be identified if the number of targets is known or assumed to be only two in the presence of plural targets.

FIG. 1 is a simplified block diagram of a radar system 10 according to an aspect of the invention. In FIG. 1, a controllable-frequency radar signal generator or source 12 generates recurrent transmit signals at an output port 12o, which are applied by way of a transmit-receive (T/R) device 14 to a sum ($\Sigma$) beamformer 16 of a monopulse antenna 18. As illustrated in FIG. 1, antenna 18 has four separate "radiating" portions designated A, B, C, and D. Those skilled in the art know that a radiating portion is also capable of reception. The sum beamformer 16 applies the signal to be transmitted to portions A, B, C, and D of antenna 18 with equal amplitude and phase, to thereby form or define the sum antenna beam. The sum beamformer 16 also acts to form a sum beam from signals received with equal amplitude and phase at the four portions A, B, C, D, and the resulting received sum signal is coupled through a portion of T/R device 14 to a receive sum ($\Sigma$) output port 14r.

Also in FIG. 1, an elevation difference (EL $\Delta$) beamformer 20 is coupled to portions A, B, C, and D of antenna 18, and takes an elevation difference, expressed as (A+B)–(C+D), to thereby form or define an elevation $\Delta$ beam at its output port 20o. An azimuth difference (AZ $\Delta$) beamformer 22 is also coupled to portions A, B, C, and D of antenna 18, and takes an azimuth difference, expressed as (A+C)–(B+D), to thereby form or define an azimuth $\Delta$ beam at its output port 22o. The receive signals produced at output ports 20o and 22o of beamformers 20 and 22, respectively, are applied to conventional monopulse processing illustrated as a block 24, which processes the received sum ($\rho$) and difference ($\Delta$) signals to produce estimates of the angular azimuth (AZ) and elevation (EL) position of the target within the sum beam.

When a single target lies in a range cell, its multiple scatterers produce echoes which mutually interfere in such a manner that the monopulse estimate of its centroid is likely to be in error. When two closely spaced targets exist in the same range cell, their echoes mutually interfere in such a manner that the monopulse estimate of the composite "target" will have a centroid which lies in an elongated cluster, the "major axis" of which is collinear with a line extending between the targets in the azimuth/elevation plane. That is to say, the major axis of the cluster of monopulse estimates of the position of the composite target is a line extending between the targets, which line is not necessarily either horizontal or vertical, but may be skewed relative to both.

According to an aspect of the invention, the azimuth and elevation estimates produced by monopulse processor 24 result from sequentially transmitted radar signals from source 12 which are at mutually different frequencies, so that the reflections or echoes from the target or targets in the region being examined have at least different phase characteristics. More specifically, control block 32 of a target number estimator 30 commands successive "pulse" or "burst" transmissions from source 12 at first, second, and third mutually different frequencies. These frequencies need not differ by a large amount, with 10 MHz differences at 10,000 MHz (10 GHz) being sufficient in one simulation. Other frequency differences are contemplated, including those that are less than or that exceed 10 MHz. The transmitted signals associated with the first pulse or burst travel through antenna 18, and propagate to a target region illustrated as 8, as suggested by the "lightning bolt" symbol 50. If a target(s), illustrated as 1, happens to be present, an echo or return signal, illustrated as a lightning bolt 51, is produced and propagates back to the antenna. In the case of a single target, the echo signal is a composite of echoes from the various scatterers of the target, and in the case of two (or more) closely spaced targets, the echo signal is a composite of echoes from the various scatterers of the two or more targets. The echo signal received back at antenna 18 resulting from the first pulse or burst transmission is coupled from the monopulse antenna 18 to the elevation and azimuth difference ports 20o and 22o, respectively, and monopulse processing is performed in block 24 to produce a signal which is an estimate of the deviation of the target's position in azimuth and elevation relative to the boresight of the antenna 18. According to an aspect of the invention, the estimated position of the target or targets in any particular range cell is coupled to a test statistic generator 34 of target number estimator 30.

Controller 32 of FIG. 1 commands or causes a second pulse or burst transmission from radar signal source 12 at a second frequency, different from the frequency of the first pulse or burst transmission. This second pulse or burst transmission propagates from antenna 18 to the target(s), if any, and an echo is produced when a target(s) is present. The second echo, associated with the second pulse or burst, will, in general, have different composite characteristics than the echo produced by the first pulse or burst. The second echo which returns to the antenna and is coupled through the EL $\Delta$ and AZ $\Delta$ beamformers 20 and 22, respectively, to the monopulse processing block 24, in the same manner as the first pulse or burst. Monopulse processing block 24 again produces an estimate of the azimuth (AZ) and elevation (EL) angle of the target(s). As a result of the different phases of the various components of the echo signal produced by the various scatterers of the target(s), the resulting estimate of the location of the target(s) within the monopulse beam, arising from the second pulse or burst, will often lie at a different location, by comparison with the estimate derived from the first burst, along the abovementioned line extending between the targets in the azimuth/elevation plane. The estimates of the position of the target(s) resulting from the first and second pulses or bursts estimates are coupled to test statistic generator 34. In a similar manner, controller 32 causes a third pulse or burst transmission from radar signal source 12 at a third frequency, different from the frequencies of the first and second pulse or burst transmissions. This third pulse or burst transmission propagates from antenna 18 to the target(s), if any, and an echo is produced, which returns to the antenna and is coupled through the EL $\Delta$ and AZ $\Delta$ beamformers 20 and 22, respectively, to the monopulse processing block 24. Monopulse processing block 24 again produces an estimate of the azimuth (AZ) and elevation (EL) angle of the target(s). The resulting estimates of the azimuth and elevation position of the target(s) are coupled to test statistic generator 34. As was the case as between the monopulse estimates of the location of the target or composite target based on the first and second pulses or bursts at their mutually different frequencies, the third pulse or burst, at a yet further different frequency, will, in general, lie at a different location along the line joining the various scatterers of the target(s). It will be clear that in the case of a single target, the scatterers are closely bunched together, so the three estimates of the position of the single target will lie on a line joining the scatterers, and are likely to be near the centroid of the single target. In the case of plural targets, the scatterers are mutually separated by at least some distance (for two objects cannot occupy the same space at the same time), and this distance will, in general, be greater than the distance between the scatterers of a single target. Consequently, the three estimates of the location of the composite target are likely to be more bunched or clustered in the case of a single target by comparison with the situation in which the target includes plural objects. The difference in cluster shape as between a single target (composed of plural scatterers) and two (or possibly more) targets, each also composed of plural scatterers, can be used to distinguish between or among single and plural targets in a given range cell.

Test statistic generator 34 processes the three azimuth and elevation estimates (a total of six values) to produce at its output port 34o a test statistic representative of the elongation of the cluster. In an exemplary embodiment, the test statistic is applied from output port 34o of generator 34 to a first (+) input port of a comparator illustrated as an amplifier 38. A second (−) input port of amplifier 38 receives a signal representative of a decision threshold from a threshold signal generator 36. The magnitude of the decision threshold is selected to tend to distinguish between a single target and two (or more) targets. Comparator amplifier 38 compares the test statistic with the decision threshold, and produces on an output path 40 an output signal 42 having at least two possible states. As illustrated in FIG. 1, when the test statistic is low, representing a relatively round rather than elongated distribution of estimated locations, the test statistic lies below the decision threshold, and the output signal 42 of comparator amplifier 38 is logic LOW. By contrast, when the test statistic is larger than the decision threshold, representing a distribution of estimated locations which is relatively elongated rather than round, comparator amplifier 38 will produce a logic HIGH level, indicative of the presence of plural targets within the range cell.

One possible application of an arrangement according to the invention is to precision approach radar used to monitor aircraft progress along a final approach to touchdown on a runway. In such a context, the logic HIGH level signal produced on path 40 by block 30 of FIG. 1 could be used to alert the controller that he is landing two closely spaced aircraft rather than a single aircraft, thus enabling the proper protocol to be selected, for increased safety.

With sufficient frequency spacing between bursts, as for example 10 MHz at 10,000 MHz, the radar cross-section (RCS) of two identical closely-spaced aircraft fluctuate independently as the radar operating frequency is changed (incremented or decremented) from burst to burst. In this context, an "identical" aircraft means an aircraft of the same type, as for example two separate F-16 type aircraft. However, due at least to differences in aspect angle of the two aircraft as seen from the radar, the scattering from identical aircraft will be different. As a result, the RCS of a single aircraft of a pair will often dominate the RCS of the other during a particular burst and a monopulse azimuth-elevation estimate obtained during this burst will be biased toward the dominant aircraft. Because the role of dominant aircraft alternates or changes randomly from burst to burst, the monopulse bias also varies from burst to burst, and to a larger extent than can be accounted for by the presence of a single aircraft or target together with thermal noise interference. A set of multiple frequency-diverse monopulse azimuth-elevation estimates obtained during a single multiple-burst beam dwell can therefore be analyzed to determine whether one or two (or possibly plural) aircraft targets are present in the beam. Once a decision has been made as to whether there is but a single target or two targets, the data set can be further analyzed to produce angle estimates for the individual aircraft.

A particular embodiment of the invention uses an underlying radar system which has certain aspects. These aspects include timesharing of a single receiver between the azimuth and elevation difference beams, so that an azimuth or an elevation estimate, but not both, can be derived from a single burst. In this radar, the azimuth estimate and the elevation estimate are made on different bursts of the same frequency, so that the target signal amplitude does not fluctuate from burst to burst. Each transmitted burst differs from immediately preceding bursts in both pulse recurrence frequency (PRF) and in radio frequency (RF) frequency, but it is only necessary for the invention that the frequencies differ. Some processing is performed to account for antenna rotation during the time between successive bursts, and other processing may be done, so that the azimuth and elevation estimates constitute one single azimuth/elevation estimate. Another aspect of this particular radar system is that the antenna rotates, but not over 360°. Instead, with the antenna tilted to one of two elevation angles, it rotates 7.5°, slows its rotation, then tilts up to the second elevation angle, and rotates 7.5° in the opposite direction back to the original azimuth, following which the antenna slows its rotation, tilts back to the original elevation angle, and repeats the cycle. Thus, the beam boresight traces a "rectangular" pattern in azimuth-elevation space, and because the antenna's azimuth rotation slows to zero before changing elevation angle and reversing direction, more constant-duration pulses occur or fit within the 6 dB beamwidth when the antenna is near the edges of its 15° azimuth coverage than when it is moving at maximum speed near the center of its coverage. In general, each transmitted pulse or burst should (in the presence of a target) result in a received echo before transmission of the next pulse or burst. The overall processing performed in such a system according to an aspect of the invention includes the steps of:

(a) performing a detection decision on each burst of the constant-frequency burst pair;

(b) if either of the bursts of (a) indicate aircraft or target detections, obtaining an E-plane monopulse estimate or measurement from one burst and an H-plane monopulse measurement from the other burst;

(c) update the older of the two measurements of (b) to correspond to the time of the newer measurement, thus accounting for azimuth rotation of the radar antenna;

(d) map the time-aligned E-plane/H-plane measurement pair into an absolute azimuth-elevation estimate pair in an earth-fixed coordinate system.

(e) repeat steps (a) through (d) for several adjacent burst pairs encompassed by the 6 dB two-way azimuth beamwidth (typically three burst pairs at maximum azimuth rotation rate near the center of the azimuth coverage and more at the edges of the azimuth coverage when the azimuth rotation rate is slower). A detected aircraft or target (or closely spaced target pair) will result in at least one, two, or three earth-fixed azimuth-elevation estimates corresponding to the independent RCS fluctuations.

In a more typical radar system, such as one including a pair of receivers, one for each of azimuth and elevation monopulse channels, the abovementioned steps (a) through (e) would reduce to:

(a) performing a detection decision on each burst;

(b) if a target detection is indicated, estimate the target azimuth and elevation relative to antenna boresight and map into an absolute azimuth-elevation estimate pair in an earth-fixed coordinate system to negate the effects of antenna rotation;

(c) repeat step (b) for all bursts (typically six) encompassed by the 6 dB two-way azimuth beamwidth. A detected target or aircraft (or closely spaced target pair) will result in up to six earth-fixed azimuth-elevation estimates corresponding to independent RCS fluctuations, assuming that all bursts are at different frequencies.

As mentioned, some radar systems, such as a precision approach radar, time-share a single receiver between the E and H plane monopulse channels from burst to burst, and because a complete E-plane/H-plane measurement pair is necessary to obtain an azimuth-elevation estimate pair, a pair of bursts is required to produce a signal azimuth-elevation estimate. Given an aircraft detection on one burst of a pair, the aircraft RCS should be fluctuate downward on the second burst, which might result in non-detection of the target or an incomplete E-plane/H-plane monopulse measurement pair. In such a situation, complete E-plane/H-plane monopulse measurement pairs requires that the radar frequency by held constant for two consecutive bursts and only be changed from pulse pair to pulse pair.

The processing performed in a system according to an aspect of the invention includes the following steps.

(a) Computation of N frequency-diverse monpulse azimuth-elevation estimates corresponding to a particular azimuth, elevation, range, and Doppler resolution cell, and, if the antenna rotates, map the estimates into a common earth-fixed coordinate system;

(b) computer the means azimuths and elevations, and subtract them from the azimuth-elevation estimates or measurements;

(c) form a 2×2 scatter matrix from the N zero-mean measurement pairs, and normalize the scatter matrix by the number of available measurements;

(d) compute the test statistic as the square-root of the largest scatter matrix eigenvalue;

(e) determine, either analytically or experimentally, a range-variable threshold based on the signal-to-noise ratio expected from a single target at the range of interest;

(f) compare the test statistic with the threshold, and deem or declare a single target to be present if the test statistic is less than the threshold, or declare two (or plural) targets to be present if the test statistic exceeds the threshold;

(g) in the event that a single target is declared, its estimated azimuth and elevation are deemed to be the mean computed in step (b) above;

(h) in the event that two targets are declared, the estimated centroid of one target is a point one test-statistic distant from the mean position computed in step (g) above, and directed along the eigenvector corresponding to the maximum scatter matrix eigenvalue. Correspondingly, the estimated centroid of the second target is a point one test-statistic distant from the mean position, but directed in a direction opposite to that of the first target.

An aspect of the invention resides in the program storage medium that constrains operation of the associated processors(s), and in the method steps that are undertaken by cooperative operation of the processor and the radar system, as well as in the printing system and printing device per se. These processes may exist in a variety of forms having elements that are more or less active or passive. For example, they can exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Examples of the foregoing include distribution of the program(s) on a CD ROM or via program download. The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and the radar system and/or other peripheral elements that cooperate with the processor. Due to such programming, the processor or computer becomes an apparatus that practices the method of the invention as well as an embodiment thereof. When implemented on such a processor, the computer program code segments configure the processor to create specific logic circuits. Such variations in the nature of the program carrying medium, and in the different configurations by which computational and control and switching elements can be coupled operationally, are all within the scope of the present invention.

An exemplary operation according to an aspect of the invention begins with consideration of the transmission of a burst of pulses, followed by coherent integration of the pulses returned from a range cell of interest, and comparison of the magnitude of the integrated sum beam signal to a detection threshold. If a target detection is indicated for the range cell, compute monopulse-based estimates of the detection's azimuth and elevation angles in an absolute earth-fixed coordinate system. Repeat the process for multiple concatenated frequency-diverse bursts such that the net time span of the total burst set corresponds approximately to the time required for the radar antenna to rotate through an azimuth angle equal to the two-way 6 dB beamwidth. Compute an azimuth and elevation angle estimate for each burst that produces a target detection in the range cell of interest. Assuming that N bursts produce target detections, organize the N resulting azimuth-elevation estimates as a 2×N data matrix D:

$$D = \begin{bmatrix} Az_1 & Az_2 & Az_3 & \ldots & Az_N \\ El_1 & El_2 & El_3 & \ldots & El_N \end{bmatrix} \qquad \text{Equation 1}$$

where $Az_n$ is the $n^{th}$ azimuth estimate in degrees and $El_n$ is the corresponding elevation estimate, also in degrees. N must be greater than or equal to three, but for best results, should be as large as possible.

Some radars require a single burst to produce each column of D while other radars may require a pair of bursts at the same frequency to produce a column. The following two-target resolution procedure depends only upon the matrix D, assuming that each column is based on a different radar frequency, and not the details of the radar that produced it. The only difference between the two cases is that the D matrix produced by a radar capable of producing an azimuth-elevation estimate from a single burst will typically have more columns than the D matrix produced by a radar that requires two bursts to form the same estimate.

Compute $\mu_{AZ}$, the mean value of the first row of D:

$$\mu_{AZ} = \frac{1}{N}\sum_{n=1}^{N} D_{1n} \text{ degrees} \qquad \text{Equation 2}$$

where $D_{1n}$ indicates the element from the first row and $n^{th}$ column of D. Modify each element of the first row by subtracting this mean such that:

$$D_{1n}=D_{1n}-\mu_{AZ} \text{ degrees } n=1,2,3,\ldots,N \qquad \text{Equation 3}$$

Following this operation, the elements of the first row of D have zero mean value.

Similarly, compute $\mu_{EL}$, the mean of the second row of D:

$$\mu_{EL} = \frac{1}{N}\sum_{n=1}^{N} D_{2n} \text{ degrees} \qquad \text{Equation 4}$$

where $D_{2n}$ indicates the element from the second row and $n^{th}$ column of D. Modify each element of the second row by subtracting this mean such that:

$$D_{2n}=D_{2n}-\mu_{EL} \text{ degrees } n=1,2,3,\ldots,N \qquad \text{Equation 5}$$

Following this operation, the elements of the second row of D have zero mean value.

Compute the 2×2 scatter matrix S:

$$S = \frac{1}{N}DD^T \qquad \text{Equation 6}$$

where the superscript T indicates matrix transpose. Alternatively, the four elements of S can be computed directly as $$S_{11} = \frac{1}{N}\sum_{n=1}^{N} D_{1n}^2 \text{ degrees}^2 \qquad \text{Equation 7}$$

$$S_{22} = \frac{1}{N}\sum_{n=1}^{N} D_{2n}^2 \text{ degrees}^2 \qquad \text{Equation 8}$$

$$S_{12} = S_{21} = \frac{1}{N}\sum_{n=1}^{N} D_{1n}D_{2n} \text{ degrees}^2 \qquad \text{Equation 9}$$

where the first subscript indicates the row index and the second subscript indicates the column index. Note that elements $S_{12}$ and $S_{21}$ are identical.

Compute the test statistic, $\gamma$, as:

$$\gamma = \sqrt{\frac{S_{11}+S_{22}+\sqrt{(S_{11}-S_{22})^2+4S_{12}^2}}{2}} \text{ degrees} \qquad \text{Equation 10}$$

where $\gamma$ is the square root of the larger of the two eigenvalues of the modified D matrix.

Establish a range-variable decision threshold, T(R) degrees, either analytically or empirically, and compare $\gamma$, the test statistic of Equation 10, to this threshold.

If $\gamma \leq T(R)$, declare one aircraft present in the range cell of interest. The single aircraft's azimuth is estimated as $\mu_{AZ}$, the mean value computed by Equation 2, and its elevation is estimated as $\mu_{EL}$, the mean value computed by Equation 4.

If $\gamma > T(R)$, declare two closely spaced aircraft present in the range cell of interest. In order to estimate the azimuth and elevation of each aircraft, first compute the quantity $\alpha$ as:

$$\alpha = \frac{\gamma^2 - S_{11}}{S_{12}} \qquad \text{Equation 11}$$

Compute $Az_1$, the estimated azimuth of one aircraft as:

$$Az_1 = \mu_{AZ} + \frac{\gamma}{\sqrt{1+\alpha^2}} \text{ degrees} \qquad \text{Equation 12}$$

and compute $El_1$, the estimated elevation of the same aircraft as:

$$El_1 = \mu_{EL} + \frac{\gamma\alpha}{\sqrt{1+\alpha^2}} \text{ degrees} \qquad \text{Equation 13}$$

Finally, compute $Az_2$, the estimated azimuth of the second aircraft as:

$$Az_2 = \mu_{AZ} - \frac{\gamma}{\sqrt{1+\alpha^2}} \text{ degrees} \qquad \text{Equation 14}$$

and $El_2$, the estimated elevation of the second aircraft as:

$$El_2 = \mu_{EL} - \frac{\gamma\alpha}{\sqrt{1+\alpha^2}} \text{ degrees} \qquad \text{Equation 15}$$

While in the exemplary embodiment depicted above, mean values of the azimuth and elevation estimates were computed and processed in accordance with an aspect of the present invention, it is understood that the present invention is not limited to determining the arithmetic mean value, but other arithmetic values associated with the azimuth/elevation data may be calculated and processed to determine the requisite target information, including but not limited to, geometric mean, root mean square value, average value, etc., referred to generally herein as arithmetic values.

The two-target resolution procedure was simulated using a computer given the following assumptions and parameters:

(a) flat-plate antenna with approximately 1° azimuth and elevation beamwidths;

(b) antenna azimuth rotation rate=50°/second;

(c) average radar cross-section (RCS) for a single aircraft is one square meter (1 m²);

(d) single-aircraft RCS fluctuation statistics burst-to-burst at the same frequency=Swerling I;

(e) single aircraft RCS fluctuation statistics burst-to-burst at different frequencies=Swerling II;

(f) two otherwise identical aircraft fluctuate independently regardless of frequency;

(g) average single-burst signal-to-noise ratio (SNR) at the output of the Doppler filter containing one aircraft=33.4 dB;

(h) average pulse repetition frequency (PRF)=7500 Hz;

(i) average radar frequency=9100 MHz;

(j) number of pulses per burst=64;

(k) beam axis at 2.5° elevation;

(l) for azimuth resolution statistics, both aircraft are positioned at 3° elevation, 0.5° above the beam axis;

(m) for elevation resolution statistics, one aircraft is positioned at 3.3°, 0.8° above the beam axis, and the second aircraft is positioned at 2.7°, 0.5° above the beam axis;

(n) six bursts are symmetrically distributed about the single aircraft's azimuth or about the mean azimuth when two aircraft are examined;

(o) error effects include (i) thermal noise, (ii) fixed biases due to element-to-element amplitude and phase errors, and (iii) bias error due to truncated antenna aperture corners;

(p) multipath effects are negligible at the aircraft elevation and range;

(q) antenna is skewed in the plane of the array such that the E-plane and H-plane monopulse axes would be skewed by 45° relative to horizontal and vertical given 0° antenna tiltback, as described in more detail in copending application entitled "Approach Radar With Array Antenna Having Rows and Columns Skewed Relative to the Horizontal" and filed on or about Apr. 1, 2003 in the name of Wasiewicz, and having Ser. No. 10/404,193;

(r) statistics are based on 10,000 Monte Carlo trials;

(s) decision threshold is set such that the probability of deciding one aircraft given one aircraft equals the probability of deciding two aircraft given two aircraft when the two aircraft are separated in elevation by 0.6°, which is the International Civil Aviation Organization (ICAO) Elevation resolution requirement for approach radars; and (t) single-burst detection threshold is set for $10^{-6}$ false alarms probability.

With the above assumptions and parameters, the simulation results show that the worst-case elevation resolution scenario where both aircraft are at the same azimuth, two aircraft approximately 0.6° apart in elevation (the ICAO requirement) are declared to be two aircraft with a probability of approximately 0.82. Similarly, when the two aircraft are at the same elevation but separated in azimuth by approximately 1.2°, the two aircraft are declared to be two aircraft with a probability of approximately 0.98.

Other embodiments of the invention will be apparent to those skilled in the art. For example, many of the functions illustrated as blocks in FIG. 1, and in particular block 30, may be performed by software or firmware rather than hardware. In general, monopulse does not require that an antenna aperture be subdivided in the manner described, as it is sufficient that the antenna be capable of producing three different combinations of the net signal impinging on the antenna, which is to say a sum output (or sum beam), an elevation difference output (or elevation difference beam), and an azimuth difference output (or azimuth difference beam). Reflector-type antennas use multiple feeds to implement these different beams and phased-array antennas form weighted sums of multiple antenna elements to form the beams. One set of weights results in a sum beam, another in an elevation difference beam, and a third set of weights produces the azimuth difference beam. Thus, the architecture of FIG. 1 represents but one way to achieve monopulse.

Thus, a monopulse radar system (10) according to an aspect of the invention comprises transmitting means (12, 14, 16, 18) for recurrently transmitting one of radar pulses and bursts, frequencies of which are controllable. A monopulse receiving system includes means (18, 20, 22) for generating an elevation difference beam and an azimuth difference beam responsive to target echoes originating from said one of radar pulses and bursts. A monopulse processing means (24) generates monopulse estimates of azimuth and elevation angle of the centroid of clustered scatterers making up target(s). Means (32, 34) are coupled to the transmitting means and to the monopulse processing means for causing the transmitting means to transmit plural ones of said one of radar pulses and bursts, and for generating a test statistic representative of the shape of cluster of the monopulse estimates arising from the plural ones. The system includes comparison means (36, 38) for comparing the test statistic with a decision value to declare presence of a single target when the test statistic is one of greater than or less than the decision value and to declare presence of plural targets when the test statistic is the other one of greater than or less than the decision value.

Although the invention has been described and pictured in exemplary form with a certain degree of particularity, it is understood that the present disclosure of such form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A monopulse method for detecting closely spaced targets, said method comprising the steps of:

transmitting toward a region which may contain a target one of a first electromagnetic pulse and a first burst of electromagnetic pulses at a first frequency;

using monopulse techniques, estimating azimuth and elevation angles from return signals in a particular range cell and arising from said first pulse or burst;

transmitting toward said region a second pulse or burst of electromagnetic pulses at a second frequency, different from said first frequency;

using monopulse techniques, estimating azimuth and elevation angles from return signals in said particular range cell and arising from said second pulse or burst;

transmitting toward said region a third pulse or burst of electromagnetic pulses at a third frequency, different from said first and second frequencies;

using monopulse techniques, estimating azimuth and elevation angles from return signals in said particular range cell and arising from said third pulse or burst;

computing an arithmetic value associated with said first, second, and third azimuth and elevation estimates to form a test statistic the magnitude of which is indicative of the number of targets present in said range cell;

comparing said test statistic with a decision threshold, and deeming the presence of a single target is said test statistic is one of greater and less than said decision threshold, and deeming the presence of two targets if said test statistic is the other one of greater and less than said decision threshold.

2. A method according to claim 1, wherein said step of forming a test statistic includes the steps of:

organizing a number N of the estimates of azimuth and elevation angles as a 2×N matrix D, with the azimuth estimates as the first row and the elevation estimates as the second row;

computing the mean value of the first row of said matrix D;

subtracting said mean value of said first row from each element of the first row of said matrix D to thereby form a modified matrix D;

computing the mean value of the second row of said matrix D;

subtracting said mean value of said second row from each element of said second row of said modified matrix D;

computing the elements of the scatter matrix S of the modified D matrix; and computing said test statistic as the square root of the larger of the two eigenvalues of the modified D matrix.

3. A method according to claim 1, wherein said step of computing an arithmetic value includes the step of calculating an arithmetic mean.

4. A monopulse radar system, said system comprising:
transmitting means for recurrently transmitting one of radar pulses and bursts, the frequencies of which are controllable;
a monopulse receiving system including means for generating an elevation difference beam and an azimuth difference beam responsive to target echoes originating from said one of radar pulses and bursts;
monopulse processing means for generating monopulse estimates of the azimuth and elevation angle of the centroid of clustered scatterers making up a target(s);
means coupled to said transmitting means and to said monopulse processing means for causing said transmitting means to transmit plural ones of said one of radar pulses and bursts, and for generating a test statistic representative of the shape of the cluster of said monopulse estimates arising from said plural ones; and
comparison means for comparing said test statistic with a decision value to declare the presence of a single target when said test statistic is one of greater than or less than said decision value and to declare the presence of plural targets when said test statistic is the other one of greater than or less than said test statistic.

5. A method for detecting the presence of a single or plural targets in a range cell of a radar system, where said radar system includes a receiver for azimuth difference and a separate receiver for elevation difference, said method comprising the steps of:
(a) performing a detection decision on each pulse or burst;
(b) if a target detection occurs, estimating the target azimuth and elevation relative to a boresight, and map the estimates into an absolute azimuth-elevation estimate pair in an earth-fixed coordinate system; and
(c) repeating the step of estimating and mapping for a plurality of said pulses or bursts.

6. A method according to claim 5, wherein said radar system includes a moving radar beam, and further comprising the step of performing said step of repeating the step of estimating and mapping for all pulses or bursts included within a given beamwidth of said antenna.

7. A method according to claim 6, wherein said given beamwidth of said antenna is the six dB beamwidth.

8. A method according to claim 7, wherein said six dB beamwidth is a two-way beamwidth.

9. A method for determining the presence of plural targets in a radar range cell, said method comprising the steps of:
computation of a plurality of frequency-diverse monopulse azimuth-elevation estimates corresponding to a particular azimuth, elevation, range, and Doppler resolution cell;
if said radar has a rotating antenna, mapping of said estimates into a common earth-fixed coordinate system;
computation of the mean azimuths and mean elevations, and subtracting said mean values from the azimuth-elevation estimates to generate mean estimate pairs;
generating a scatter matrix from the mean estimate pairs, and normalizing the scatter matrix by the number of available estimates;
generating a test statistic as the square-root of the largest scatter matrix eigenvalue;

determining a range-variable threshold based on the signal-to-noise ratio expected from a single target at the range of interest;
comparing the test statistic with said threshold, and deeming a single target to be present if the test statistic is one of greater or less than the threshold, and deeming plural targets to be present if the test statistic is the other of greater than or less than the threshold.

10. A method according to claim 9, further comprising the steps of:
in the event that a single target is deemed to be present, deeming its estimated azimuth and elevation to be the means determined in said step of computation of the mean azimuths and elevations; and
in the event that plural targets are deemed to be present, deeming the centroid of one of said plural targets to be one test statistic distant from said estimated azimuth and elevation established by said means determined in said step of computation of the mean azimuths and elevations.

11. A monopulse method for detecting closely spaced targets, said method comprising the steps of:
transmitting toward a region which may contain a target a first pulse or burst of electromagnetic pulses at a first frequency;
using monopulse techniques, estimating azimuth and elevation angles from return signals in a particular range cell and arising from said first pulse or burst;
transmitting toward said region a second pulse or burst of electromagnetic pulses at a second frequency, different from said first frequency by 10 MHz;
using monopulse techniques, estimating azimuth and elevation angles from return signals in said particular range cell and arising from said second pulse or burst;
transmitting toward said region a third pulse or burst of electromagnetic pulses at a third frequency, different from said first and second frequencies;
using monopulse techniques, estimating azimuth and elevation angles from return signals in said particular range cell and arising from said third pulse or burst;
computing an arithmetic value associated with said first, second, and third azimuth and elevation estimates to form a test statistic the magnitude of which is indicative of the number of targets present in said range cell;
comparing said test statistic with a decision threshold, and deeming the presence of a single target if said test statistic is one of greater and less than said decision threshold, and deeming the presence of two targets if said test statistic is the other one of greater and less than said decision threshold.

12. A method according to claim 11, wherein said first frequency is in the general vicinity of 10 GHz.

13. A computer readable medium containing code for controlling operation of a processor associated with a radar system for detecting closely spaced targets, the code being executable to perform a method comprising:
controlling of transmission toward a region which may contain a target a first burst of electromagnetic pulses at a first frequency;
using monopulse techniques, estimating azimuth and elevation angles from return signals in a particular range cell and arising from said first burst;
controlling of transmission toward said region a second burst of electromagnetic pulses at a second frequency, different from said first frequency;

using monopulse techniques, estimating azimuth and elevation angles from return signals in said particular range cell and arising from said second burst;

controlling of transmission toward said region a third burst of electromagnetic pulses at a third frequency, different from said first and second frequencies;

using monopulse techniques, estimating azimuth and elevation angles from return signals in said particular range cell and arising from said third burst;

computing an arithmetic value associated with said first, second, and third azimuth and elevation estimates to form a test statistic the magnitude of which is indicative of the number of targets present in said range cell;

comparing said test statistic with a decision threshold, and deeming the presence of a single target is said test statistic is one of greater and less than said decision threshold, and deeming the presence of two targets if said test statistic is the other one of greater and less than said decision threshold.

14. The computer readable medium according to claim 13, wherein said step of forming a test statistic includes the steps of:

organizing a number N of the estimates of azimuth and elevation angles as a 2×N matrix D, with the azimuth estimates as the first row and the elevation estimates as the second row;

computing the mean value of the first row of said matrix D;

subtracting said mean value of said first row from each element of the first row of said matrix D to thereby form a modified matrix D;

computing the mean value of the second row of said matrix D;

subtracting said mean value of said second row from each element of said second row of said modified matrix D;

computing the four elements of the scatter matrix S of the modified D matrix; and computing said test statistic as the square root of the larger of the two eigenvalues of the modified D matrix.

15. The computer readable medium according to claim 13, wherein said step of computing an arithmetic value includes the step of calculating an arithmetic mean.

16. A computer readable medium containing code for controlling operation of a processor associated with a radar system for detecting closely spaced targets, the code being executable to perform a method for detecting the presence of a single or plural targets in a range cell of a radar system, where said radar system includes a receiver for azimuth difference and a receiver for elevation difference, said method comprising the steps of:

(a) performing a detection decision on each burst;

(b) if a target detection occurs, estimating the target azimuth and elevation relative to a boresight, and map the estimates into an absolute azimuth-elevation estimate pair in an earth-fixed coordinate system; and (c) repeating the step of estimating and mapping for a plurality of bursts.

17. A computer readable medium according to claim 16, wherein said method further comprises the step of performing said step of repeating the step of estimating and mapping for all bursts included within a given beamwidth of a moving antenna of said radar system.

18. A computer readable medium according to claim 16, where said method further comprises the step of performing said step of repeating the step of estimating and mapping for all bursts included within a a 6 dB beamwidth of a moving antenna of said radar system.

19. A computer readable medium according to claim 18, wherein said six dB beamwidth is a two-way beamwidth.

20. A computer readable medium containing code for controlling operation of a processor associated with a radar system for detecting closely spaced targets, the code being executable to perform a method for determining the presence of plural targets in a radar range cell, said method comprising the steps of:

computation of a plurality of frequency-diverse monopulse azimuth-elevation estimates corresponding to a particular azimuth, elevation, range, and Doppler resolution cell;

if said radar has a rotating antenna, mapping of said estimates into a common earth-fixed coordinate system;

computation of the mean azimuths and mean elevations, and subtracting said mean values from the azimuth-elevation estimates;

generating a 2×2 scatter matrix from the plural zero-mean estimate pairs, and normalize the scatter matrix by the number of available estimates;

generating a test statistic as the square-root of the largest scatter matrix eigenvalue;

determining a range-variable threshold based on the signal-to-noise ratio expected from a single target at the range of interest;

comparing the test statistic with said threshold, and deeming a single target to be present if the test statistic is one of greater or less than the threshold, and deeming plural targets to be present if the test statistic is the other of greater than or less than the threshold.

21. A computer readable medium according to claim 20, wherein said method further comprises the steps of:

in the event that a single target is deemed to be present, deeming its estimated azimuth and elevation to be the means determined in said step of computation of the mean azimuths and elevations; and in the event that plural targets are deemed to be present, deeming the centroid of one of said plural targets to be one test statistic distant from said estimated azimuth and elevation established by said means determined in said step of computation of the mean azimuths and elevations.

22. A computer readable medium containing code for controlling operation of a processor associated with a radar system for performing a monopulse method for detecting closely spaced targets, said method comprising the steps of:

transmitting toward a region which may contain a target a first burst of electromagnetic pulses at a first frequency;

using monopulse techniques, estimating azimuth and elevation angles from return signals in a particular range cell and arising from said first burst;

transmitting toward said region a second burst of electromagnetic pulses at a second frequency, different from said first frequency by 10 MHz;

using monopulse techniques, estimating azimuth and elevation angles from return signals in said particular range cell and arising from said second burst;

transmitting toward said region a third burst of electromagnetic pulses at a third frequency, different from said first and second frequencies;

using monopulse techniques, estimating azimuth and elevation angles from return signals in said particular range cell and arising from said third burst;

computing an arithmetic value associated with said first, second, and third azimuth and elevation estimates to form a test statistic the magnitude of which is indicative of the number of targets present in said range cell;

comparing said test statistic with a decision threshold, and deeming the presence of a single target is said test statistic is one of greater and less than said decision threshold, and deeming the presence of two targets if said test statistic is the other one of greater and less than said decision threshold.

23. A computer readable medium according to claim 22, wherein said first frequency is in the general vicinity of 10 GHz.

* * * * *